Patented Sept. 30, 1924.

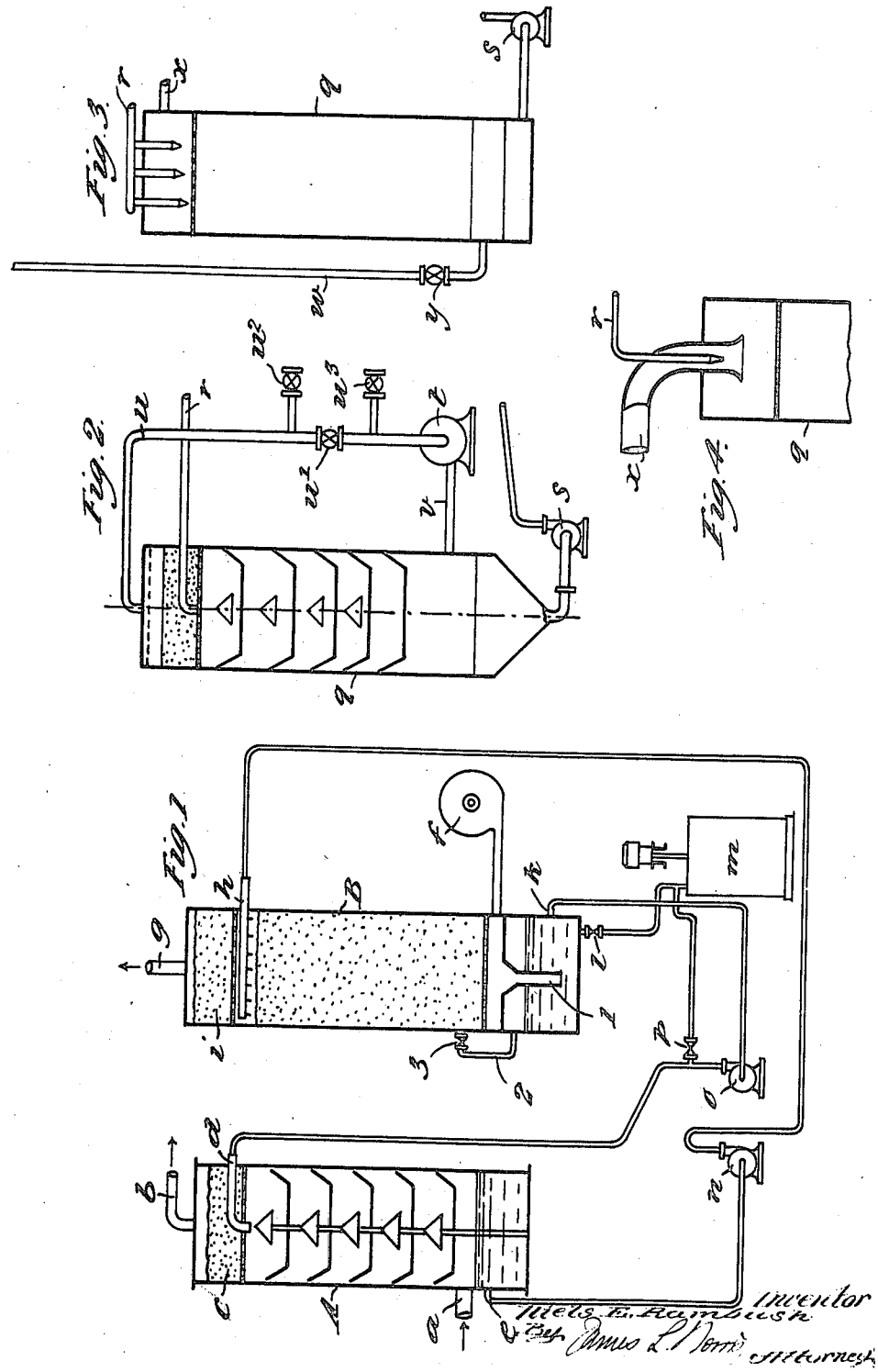

1,510,342

UNITED STATES PATENT OFFICE.

NIELS E. RAMBUSH, OF STOCKTON-ON-TEES, ENGLAND.

RECOVERY OF SULPHUR FROM GASES.

Application filed August 10, 1920. Serial No. 402,690.

*To all whom it may concern:*

Be it known that I, NIELS EDWARD RAMBUSH, a subject of the King of Denmark, residing in Stockton-on-Tees, England, have invented certain new and useful Improvements in the Recovery of Sulphur from Gases, of which the following is a specification.

The wet process of removing sulphur from gases by passing them through a suspension or sludge of iron oxide or other suitable oxide in water or a solution of a salt has certain advantages owing to the fact that the material may be pumped and to the further fact that thorough contact between gas and liquid is more easily attained than between gas and solid. Thus a circulatory process is more easily realized when using a liquid than when using a solid, since the liquid, which is a suspension from the first or rapidly becomes a suspension, may be circulated through mixers continuously traversed by the gases and through one or more vats applied with an injection of air.

I have found that injecting air into an open vat is a very imperfect or costly mode of revivification, and that for satisfactory revivification it is essential that the sulphided suspension should be brought in distributed condition into contact with air or oxygen, for instance in thin layers such as are obtained in a reaction tower.

When regard is had to the recovery of the sulphur as completely as possible, it is important that the contents of the tank, vats or the like, containing the suspension or sludge which is being, or has been, revivified, should not be in contact with the atmosphere, but in direct contact with the gas with which they have been reacting.

My invention relates to a process for removing sulphur from gases, wherein a suspension or sludge of ferric oxide or like oxide in water or a solution of a salt is circulated continuously through a sulphiding vessel in which it meets the gas and then through a vessel in which it is exposed in distributed condition to the revivifying action of air or oxygen.

In the preferred method of carrying out the process the conditions are such that the amount of revivifying gas escaping from the apparatus per unit of revivification effected, is the minimum practicable. This is because the escaping revivifying gas carries sulphur, so that if a larger volume of this gas than is necessary be used the loss of sulphur may be of importance.

This preferred method may be applied by circulating the revivifying gas in a closed cycle through the revivification apparatus, or by causing such a slow travel of the revivifying gas through the apparatus that the partial pressure of the available oxygen in the gas is reduced to that below which revivification proceeds at an uneconomical rate. When air is used the content of oxygen may readily be reduced to 8 per cent of the total volume of air used without rendering the process uneconomical, and a considerably lower limit may be attained, depending on variable conditions, such as the nature of the suspension, the design of apparatus and the temperature.

When circulation of the revivifying gas is employed, the loss of sulphur escaping in a gaseous state may be under 1 per cent of the loss incurred when air is passed only once at the same rate through the revivification plant. By means of a suitable valve arrangement, air or oxygen can be more or less continuously admitted into the system as the partial pressure of the oxygen becomes reduced owing to the absorption of oxygen by the sulphided sludge and to dissolution of the air in the liquid. Or a small proportion of fresh air may be periodically or continuously blown into one part of the system while an escape is afforded for used air at another part. Generally, however, it is essential to blow the exhausted air out of the system every now and then in order to substitute fresh air.

Whether circulation of the revivifying gas be adapted or not, for satisfactory continuity of the process, a portion of the revivified suspension may be withdrawn periodically or continuously from the circulation and the precipitated sulphur separated from it by mechanical means (such as fractional subsidence or centrifugal action), whereupon it is returned to the circulation.

I have found that ferric hydrate suspended in a solution of sulphate of iron is a good material for my purpose. It may be used in any suitable washing apparatus for washing the crude gas and then be passed into a tower which it descends, meeting air passing in the opposite direction; and from this tower it may be returned to the washer.

In the accompanying diagrams representing vertical sections of apparatus Fig. 1 shows an apparatus for carrying out the invention when circulation of the revivifying gas is not adopted. Fig. 2 shows a reaction tower suitable for use when circulation of the revivifying gas is employed. Fig. 3 shows a reaction tower suitable for use when the revivifying gas is caused to travel slowly through the tower. Fig. 4 shows a modification.

Referring to Fig. 1, the cold and clean gas to be purified from $H_2S$ is passed at $a$ into the absorption tower A which it leaves at $b$, having passed through a filter $c$ for removing spray carried forward by the gas. The suspension enters at $d$ and flows, over distributing cones and discs of well-known type, to the bottom of the tower which it leaves at $e$. Pump $n$ forwards it to the top of the revivifying tower B which it enters at $h$. This tower may be packed in any suitable known manner or may be designed like vessel A; at top it has a filter $i$ for removing spray and at bottom receives air from a blower $f$.

The pipe I through which the suspension flows into the collecting tank at the bottom of the tower, is sealed by the liquid in this tank. Gas carried down with the suspension collects above the liquid in the tank and passes by pipe 2 back into the tower. When it is necessary to clean the tank, valve 3 in pipe 2 may be closed so that gas or air cannot escape from the tower by pipe 2.

The air ascends to the tower, leaving at $g$. The pump $o$ draws the suspension from tower B at the point $k$ and raises it to the point $d$ of tower A. A portion of the suspension is continuously or periodically removed to the centrifugal separator $m$ by means of a pipe from the extreme bottom of the tower B, controlled by valve $l$, or by means of a pipe from the discharge side of pump $o$, controlled by the valve $p$, or by means of both such pipes. In this manner the suspension may be withdrawn from the upper or the lower part, or both parts, of the sump at the bottom of tower B at will. The sulphur having been separated, the oxide material and the solution are returned to the $H_2S$ absorbing system.

A suitable suspension for use in such an apparatus consists of a solution of ferrous sulphate containing 5 to 20 grams $$FeSO_4.7H_2O$$

per litre, in which are suspended 10–40 grams of precipitated hydrated iron oxide per litre.

In Fig. 2 the reaction tower $q$ is fed with the sulphided suspension through a pipe $r$, the suspension being returned to the sulphiding vessel by pump $s$ which withdraws it from the bottom of the tower.

The pump $t$ draws air from the tower by pipe $u$ and returns it to the tower by pipe $v$. In the pipe $u$ is a valve $u^1$ placed between two branch pipes controlled by valves $u^2$ and $u^3$ respectively. By closing valves $u^2$ and $u^3$ and opening valve $u^1$, the gases in the tower will be circulated in a closed cycle. By closing valve $u^1$ and opening valves $u^2$ and $u^3$, fresh air will be drawn in at $u^3$ and foul air from the tower expelled at $u^2$. By adjusting the three valves $u^1$, $u^2$ and $u^3$ there may be a small current of fresh air admitted at $u^3$ and a corresponding current of foul air expelled at $u^2$.

In Fig. 3 the reaction tower $q$ is suitably packed and into it the supply of revivifying air is drawn by a chimney $w$ so that a fan is not necessary. In this case the revivifying gas is not circulated but is drawn in at the top of the tower through pipe $x$ at such a slow rate controlled by adjusting valve $y$, that the gases escaping by chimney $w$ are suitably exhausted of available oxygen as aforesaid. As before, the suspension enters the tower at $r$ and is removed by pump $s$. If necessary any suitable means for improving the draught in chimney $w$ may be adopted, and the tendency of the inflowing suspension to draw air through pipe $x$ may be relied upon to aid the process. The last named effect may be enhanced by constructing the suspension delivery pipe $r$, in the manner shown in Fig. 4, within the air inlet pipe $x$, so as to cause an injector action.

Having thus described the nature of the said invention, and the best means I know of carrying the same into practical effect, I claim:—

1. In a process of removing sulphur from gases by means of a suspension of solid oxidizing agent, circulating the suspension in a distributed condition in a closed path through one part of which the gas is continuously passed while into another part free oxygen is admitted at such a slow rate that the partial pressure of the available oxygen in the atmosphere in this part is reduced to that below which revivification proceeds at an uneconomical rate.

2. In a process of removing sulphur from gases by means of a suspension of solid oxidizing agent, circulating a suspension of hydrated ferric oxide in a solution of ferrous sulphate in a distributed condition in a closed path through one part of which the gas is continuously passed while in another part the suspension meets free oxygen.

In testimony whereof I have signed my name to this specification.

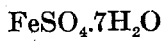
NIELS E. RAMBUSH.